UNITED STATES PATENT OFFICE.

WILLIAM M. GROSVENOR, OF GRANTWOOD, NEW JERSEY, ASSIGNOR TO WENBORNE-KARPEN DRYER COMPANY, OF CHICAGO, ILLINOIS, A CORPORATION OF WEST VIRGINIA.

PROCESS FOR DRYING OR HARDENING COATINGS.

1,186,477. Specification of Letters Patent. Patented June 6, 1916.

No Drawing. Application filed November 20, 1908. Serial No. 463,528.

*To all whom it may concern:*

Be it known that I, WILLIAM M. GROSVENOR, a citizen of the United States, and a resident of Grantwood, Bergen county, and State of New Jersey, have invented certain new and useful Improvements in Processes for Drying or Hardening Coatings, of which the following is a specification.

My invention relates to improvements in processes for drying or hardening coatings such as coatings of varnish, shellac, fillers or similar materials.

It is one object of my invention to provide a method or methods by which such coatings may be more rapidly dried or hardened when freshly applied and to produce coatings which are in many ways superior to others produced by different processes.

I find that the drying or hardening of varnishes and the like is greatly facilitated and speeded when the freshly applied coating is subjected to the action of moisture or water vapor in excess of the natural humidity, and also that the drying or hardening is also speeded by the chemical action of oxidizing agents more powerful than air upon the siccative constituents of the varnish or other coating. I therefore provide an improved method or methods for treating the coatings with water vapor or an oxidizing agent or both which are preferably in a gaseous form and which is preferably carried out under the action of heat, and with automatic means for causing a thorough circulation of the gases.

Further objects, features and advantages will be more clearly understood from the detail description given below in which I fully describe a process embodying one form of my invention.

A wooden or other surface is freshly treated with a coating of varnish or similar substance and is then placed in a suitable apparatus for carrying out my improved process. For this purpose I preferably use devices much the same as are described in United States Letters Patent to Holmes, No. 231,168 or to Hanrahan, No. 687,305, or to Smith, No. 747,788. By means of any suitable devices a weak solution of nitric acid in the presence of starch is heated and the volatile lower oxids of nitrogen NO and $NO_2$ are driven off and by proper means these gases are thoroughly circulated or forced about in a cyclic path so as to come into intimate and continual contact with the coating. However, the use of such oxidizing agents is not essential to my invention in its broader aspects.

The water vapor or moisture may be produced from a vessel of water in any suitable manner and heat is applied through heating coils or otherwise to bring the gases and vapors to the proper temperature. When the oxidizing solution has been evaporated sufficiently the temperature is raised slowly to about 100° F. The increased heat evaporates the water and at the same time aids the action of the gases upon the coating and increases the drying or hardening actions. By a steady increase of temperature to about 120° F. the coating may be readily dried. I believe the oxygen from the oxid $NO_2$ as well as from the air enters into direct chemical combination with the siccative elements of the varnish to cause a drying or hardening of the same, and that both the moisture and the oxid NO act catalytically to cause oxygen from the air or surrounding gases to be absorbed by said siccative constituents to produce substantially the same result.

The use of heat alone with the ordinary air drying is not satisfactory. It is well recognized that rapid drying by heat alone as a rule produces poor results. The solvent evaporates quickly, but oxidation follows slowly and the heat warps the woodwork. Therefore the rapid hardening in this manner is disadvantageous. Likewise, if it be attempted to dry quickly by increasing the supply of fresh air, one is liable to get merely a surface drying forming a thin skin on the varnish, which greatly retards the drying beneath. But by combining with either one of these features the simultaneous treatment with a suitable amount of moisture the premature surface drying is prevented and the bad effects of the heat are eliminated. The presence of the moisture increases the rate of drying. Also I believe that the action of the forced circulation reduces the bad effects of the heat even when used without moisture.

In the drying of fillers a much less action of the oxid or oxidizing agent is required since these materials usually contain much less siccative matter. For these materials the amounts of oxidizing materials and water vapor may be varied to suit their requirements.

Shellac can be dried in two hours with a less quantity of water and practically no oxidizing agent, the residual vapors remaining in the kiln being sufficient for this purpose. The maximum temperature should not exceed 110° F. for most of the commercial grades of shellac and should be slowly applied. Great care should be taken to insure the thorough dryness of the filler before shellac or varnish is applied thereon.

The material may now be removed from the kiln and varnished, replaced in the kiln and the treating chemicals again prepared. In this case the action required for a very high grade varnish is largely siccative and the amount of oxidizing agent is governed by experience with the varnishes in use and varies very greatly. Sufficient water, however, should be used either in the mixture or separately, as above indicated, to produce a humidity in excess of 60% at the temperature varying from 100 to 120. The final drying of the varnish coat may be carried as high as 150 with a good quality of varnish. The temperature is gradually raised as the water is evaporated from 70 to 110. It is then maintained at about this temperature for another hour, after which it may be slowly and steadily raised. The best grades of varnish can be thus dried in from five to seven hours and the cheaper grades, as a rule, more rapidly.

The above procedure, even upon grades of varnish which usually require a period of 36 to 48 hours before becoming hard enough to grind, enables me to apply the filler, shellac and one coat of varnish in 24 hours, the coat of varnish being allowed to dry over night. As many additional coats of such varnish as are desired can be applied at the rate of about two coats per day.

In the description of this process I cannot specify any particular amount of humidity or any exact percentage by volume of oxygen carriers in the vapors because the requirements of different varnishes vary so greatly, nor do I confine myself to oxids of nitrogen since other carriers of oxygen, such as heated water vapor, and even other oxidizing agents such as chlorin and the like may suffice, although the oxids of nitrogen have proven most satisfactory of any agents yet used. Under some circumstances it will be found more convenient to generate these oxids in other ways as by the separate heating of a proper quantity of nitrate of lead.

I have found that after the process is once started many batches may be dried in the system without again starting it up, that is, it is not necessary to begin at a low temperature or to add fresh oxids of nitrogen with each separate batch to be dried, provided a suitable temperature and excess of moisture are maintained.

Although I have described my invention with great detail and have specifically mentioned certain compounds which I prefer to use, I do not desire to be limited to such compounds or details but Having fully and clearly described my improvements, what I claim as new and desire to secure by Letters Patent, is:

1. In an improved process for drying and hardening siccative coatings, subjecting the coatings to the action of moisture in excess of the natural humidity and an oxidizing agent more powerful than air.

2. In an improved process for drying and hardening siccative coatings, simultaneously subjecting the coatings to the action of the moisture in excess of the natural humidity and heat.

3. In an improved process for drying and hardening siccative coatings, simultaneously subjecting the coatings to the action of a suitable oxidizing agent moisture and heat and causing thorough circulation of the agent about the coatings.

4. In an improved process for drying and hardening siccative coatings, simultaneously subjecting the coatings to the action of moisture in excess of the natural humidity and heat and causing forced circulation of the moisture about the coatings.

5. In an improved process for drying and hardening siccative coatings, subjecting the coatings to the action of moisture in excess of the natural humidity and an oxidizing agent more powerful than air and heat.

6. In an improved process for drying and hardening siccative coatings, subjecting the coatings to the action of moisture in excess of the natural humidity and an oxidizing agent more powerful than air and heat and causing forced and thorough circulation of the moisture and agent about the coatings.

7. The process of drying or hardening siccative coatings which consists in subjecting them to the action of air, moisture and a gaseous reagent to promote the oxidation of siccative elements in the coatings.

8. The improved process of drying and hardening coatings which consists in submitting them to the action of water vapor in excess of the natural humidity and a carrier of oxygen both in a gaseous form and causing forced circulation thereof, to bring them into continual contact with the coatings and simultaneously submitting the coatings to the action of heat.

9. The improved method of drying and hardening coatings which consists in treating the same with an oxygen fluid, moisture and a reagent to cause oxygen to be taken up by said coatings.

10. The process of drying and hardening varnishes or the like which consists in exposing them to a gaseous agent containing more moisture than 12 grains per cubic foot and also to the action of heat.

11. The process of drying and hardening varnishes or the like which consists in exposing them to an automatically circulated mixture of gases containing more water vapor than 12 grains per cubic foot and also containing oxidizing agents more powerful than air to convey oxygen to the siccative elements of the varnish or the like.

12. The process of drying and hardening varnish coatings or the like which consists in exposing them to the lower oxids of nitrogen and heat and moisture in excess of the natural humidity.

In testimony whereof, I have signed my name to this specification, in the presence of two subscribing witnesses.

WILLIAM M. GROSVENOR.

Witnesses:
　EDWIN SEGER,
　GORHAM CROSBY.